US012013207B2

(12) United States Patent
Leon-Guerrero

(10) Patent No.: US 12,013,207 B2
(45) Date of Patent: Jun. 18, 2024

(54) REMOTE HANDGRIP SWITCH

(71) Applicant: Sig Sauer, Inc., Newington, NH (US)

(72) Inventor: Edward P. Leon-Guerrero, Wilsonville, OR (US)

(73) Assignee: SIG SAUER, INC., Newington, NH (US)

( * ) Notice: Subject to any disclaimer, the term of this patent is extended or adjusted under 35 U.S.C. 154(b) by 17 days.

(21) Appl. No.: 17/364,537

(22) Filed: Jun. 30, 2021

(65) Prior Publication Data

US 2022/0003519 A1 Jan. 6, 2022

Related U.S. Application Data

(60) Provisional application No. 63/047,810, filed on Jul. 2, 2020.

(51) Int. Cl.
*F41C 23/16* (2006.01)
*H01H 21/22* (2006.01)

(52) U.S. Cl.
CPC ............. *F41C 23/16* (2013.01); *H01H 21/22* (2013.01)

(58) Field of Classification Search
CPC ................................. F41C 23/16; F41C 27/00
See application file for complete search history.

(56) References Cited

U.S. PATENT DOCUMENTS 5,179,235 A 1/1993 Toole
5,388,364 A 2/1995 Paldino
5,435,091 A 7/1995 Toole et al.
5,481,819 A 1/1996 Teetzel
5,622,000 A 4/1997 Marlowe
5,706,600 A 1/1998 Toole et al.
6,146,141 A 11/2000 Schumann
6,578,311 B2 6/2003 Danielson et al.
6,622,416 B2 * 9/2003 Kim .......................... F41G 1/35 42/114
7,260,910 B2 8/2007 Danielson
7,523,583 B2 * 4/2009 Cheng ................... F41G 11/003 42/114
7,559,167 B1 * 7/2009 Moody ................... F41C 23/16 42/71.01
7,568,304 B1 * 8/2009 Moody ................... F41C 23/16 42/71.01

(Continued)

FOREIGN PATENT DOCUMENTS

EP 0929786 B1 2/2003
KR 2020150001058 U 3/2015

(Continued)

*Primary Examiner* — Jonathan C Weber
(74) *Attorney, Agent, or Firm* — Miller Nash LLP

(57) ABSTRACT

A grip for a firearm having a controllable accessory has a first axis aligned with a long axis of the firearm and a second axis transverse the first axis. The grip includes an elongated switch lever having a pivot end and a controlled end, the elongated switch lever having a long axis aligned with the second axis of the grip and coupled at the controlled end to a thumb pad extending beyond a main body of the grip, a pivot disposed at the pivot end of the elongated switch lever about which the elongated switch lever may rotate, and a switch mounted in the grip adjacent to the elongated switch lever and configured to change states when the thumb pad is depressed.

9 Claims, 9 Drawing Sheets

(56) References Cited

U.S. PATENT DOCUMENTS

| | | | | |
|---|---|---|---|---|
| 7,621,065 | B2 * | 11/2009 | Gablowski | F41G 1/52 42/111 |
| D616,957 | S | 6/2010 | Rievley et al. | |
| 7,805,876 | B1 | 10/2010 | Danielson et al. | |
| 7,841,120 | B2 | 11/2010 | Teetzel et al. | |
| 8,091,265 | B1 * | 1/2012 | Teetzel | F41C 23/16 42/71.01 |
| 8,109,032 | B2 * | 2/2012 | Faifer | G03B 17/563 42/114 |
| 8,256,154 | B2 | 9/2012 | Danielson et al. | |
| 8,752,321 | B2 | 6/2014 | Burress, Jr. | |
| 9,134,094 | B2 | 9/2015 | Hilbourne et al. | |
| 9,243,865 | B1 | 1/2016 | Bruhns | |
| 9,791,240 | B2 | 10/2017 | Bruhns | |
| 9,921,027 | B2 | 3/2018 | Bruhns | |
| 10,942,004 | B2 * | 3/2021 | Grenier | F41C 23/16 |
| 2005/0241206 | A1 * | 11/2005 | Teetzel | F41A 23/08 42/72 |
| 2009/0140015 | A1 * | 6/2009 | Faifer | F41C 23/16 224/191 |
| 2010/0031552 | A1 * | 2/2010 | Houde-Walter | F41C 23/16 42/72 |
| 2010/0132239 | A1 | 6/2010 | Moody et al. | |
| 2010/0164401 | A1 * | 7/2010 | Matthews | F41G 1/35 362/110 |
| 2010/0242332 | A1 * | 9/2010 | Teetzel | F41A 23/22 42/72 |
| 2011/0167699 | A1 | 7/2011 | Griffin | |
| 2011/0261204 | A1 * | 10/2011 | Smith | G02B 27/017 348/E7.091 |
| 2012/0055061 | A1 * | 3/2012 | Hartley | F41C 23/16 42/84 |
| 2012/0124885 | A1 | 5/2012 | Caulk et al. | |
| 2012/0131840 | A1 | 5/2012 | Toole | |
| 2013/0185982 | A1 | 7/2013 | Hilbourne et al. | |
| 2013/0301243 | A1 * | 11/2013 | Rorick | F41G 1/00 362/110 |
| 2013/0305580 | A1 * | 11/2013 | Burress, Jr. | F41C 23/16 42/71.01 |
| 2013/0333263 | A1 * | 12/2013 | Hovey | F41C 23/16 42/72 |
| 2014/0007485 | A1 | 1/2014 | Castejon, Sr. | |
| 2015/0276352 | A1 * | 10/2015 | Chang | F41G 11/003 42/114 |
| 2016/0084601 | A1 * | 3/2016 | Alicea, Jr. | F41A 19/10 42/6 |
| 2017/0089656 | A1 * | 3/2017 | Alicea, Jr. | F41A 19/69 |
| 2017/0108301 | A1 | 4/2017 | Murphy, II et al. | |
| 2017/0146315 | A1 | 5/2017 | Bruhns | |
| 2018/0058805 | A1 | 3/2018 | Mock et al. | |
| 2019/0145730 | A1 | 5/2019 | Chavez | |
| 2020/0025488 | A1 * | 1/2020 | Alicea, Jr. | F41A 17/22 |

FOREIGN PATENT DOCUMENTS

| | | | | |
|---|---|---|---|---|
| RU | 2666122 | C2 | 9/2018 | |
| WO | 2006104571 | A2 | 10/2006 | |
| WO | WO-2009064326 | A1 * | 5/2009 | F41C 27/00 |
| WO | WO-2016033119 | A1 * | 3/2016 | F41C 23/12 |
| WO | WO-2018197270 | A1 * | 11/2018 | F41C 23/14 |

* cited by examiner

REMOTE HANDGRIP SWITCH

CROSS-REFERENCE TO RELATED APPLICATIONS

This application is a non-provisional of and claims benefit to U.S. provisional patent application No. 63/047,810, filed Jul. 2, 2020, titled REMOTE HANDGRIP SWITCH, the disclosure of which is incorporated herein by reference in its entirety.

TECHNICAL FIELD

This invention relates to firearm grips, and, more particularly, to a firearm grip having a remote activation system.

BACKGROUND

Modern firearms may include one or more remote activation switches to control operation of firearm accessories, such as magnified optics, red dot, rangefinders, illumination lights, and lasers, etc. Common examples of remote activations include on/off switches, momentary push switches, and pressure pad switches. Sometimes pressure pad switches are called tape switches, which generally include a pad having an internal switch coupled to a ribbon wire that terminates in the controlled device. Typically the switch is mounted somewhat close to where a shooter keeps his or her hands or fingers, and the wire extends to wherever the device is mounted. In this manner, the shooter can easily control the remote switch by manipulating it by hand, such as pressing buttons, which then controls the remote-mounted device.

Many pistol grips or grip accessories include switches operable by a shooter's middle figure, typically located under or as a part of the trigger guard. Switches having such a configuration are sometimes uncomfortable to operate. Other times it is difficult to keep constant pressure on the trigger while operating the switch with the middle finger. In such configurations operating the accessory switch could cause accidental discharge of the firearm.

Embodiments of the disclosure describe a new type of switch useful for firearms that overcome shortcomings of the conventional art.

BRIEF DESCRIPTION OF THE DRAWINGS

FIG. 4B illustrates how the pivot pin 230 is mounted within and interfaces with the lever arm 220, according to embodiments.

DETAILED DESCRIPTION

Embodiments of the invention employ a lever switch system using a natural thumb motion to push and close a switch circuit activating or controlling the remote accessory. In some embodiments the lever is mountable on either the left or right side of the grip, suitable for both left-handed and right handed shooters.

Figure 1A:
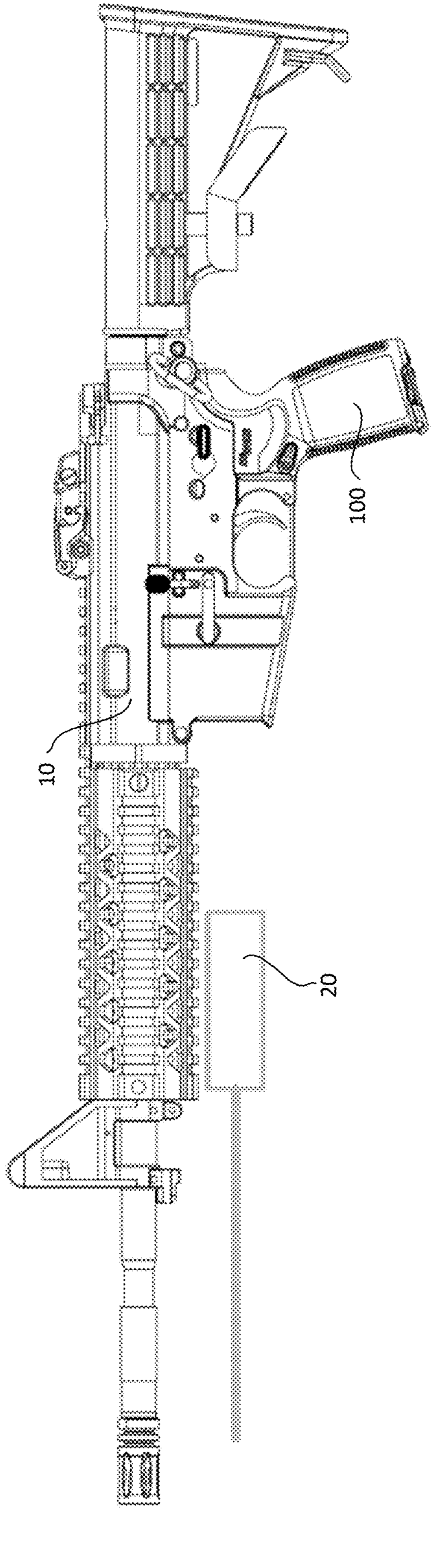
FIG. 1A is side view of a rifle having a grip with a remote activation switch, according to embodiments of the invention.
Figure 1B:
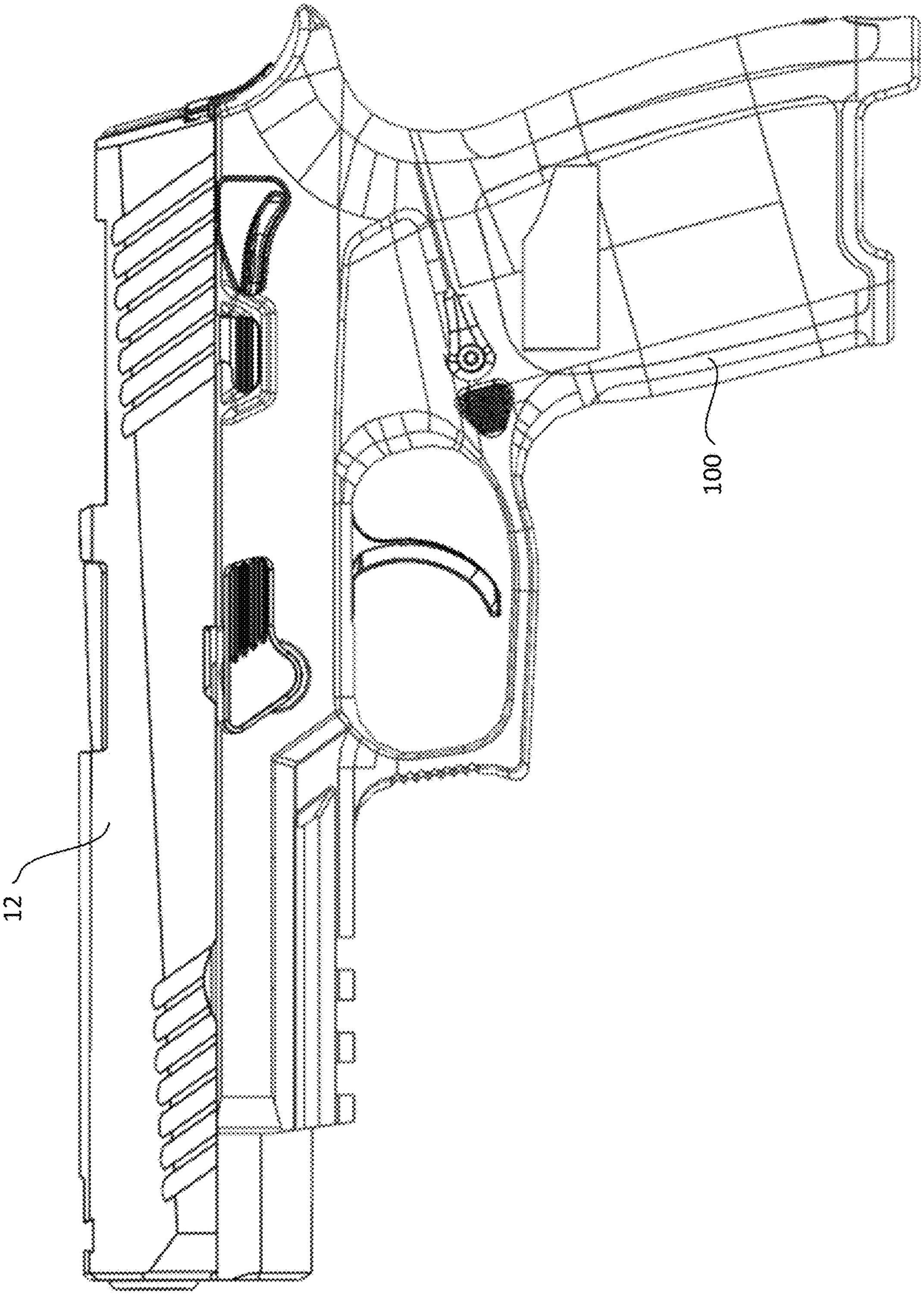
FIG. 1B is side view of a pistol having a grip with a remote activation switch, according to embodiments of the invention.

FIG. 1A is a side view of a firearm 10 having a grip 100 with a remote activation switch, according to embodiments of the invention. FIG. 1B is a side view of a pistol 12 also having the grip 100 with a remote activation switch, according to embodiments of the invention. Although FIGS. 1A and 1B illustrates a rifle and pistol having a rear grip, respectively, embodiments of the invention may be used in conjunction with front grips, or even with other objects that may benefit from including a grip with a remote activation switch. The firearms 10 and 12 each have a shooting axis, which is the axis along which a barrel is oriented. The firearm 10 of FIG. 1 also includes an accessory 20, such as a laser sight, the operation of which may be controlled by the remote activation switch. In some embodiments the remote activation switch may be used to turn the accessory on and off, while in other embodiments the remote activation switch may be used to control a controllable feature of the accessory, such as a brightness level of the accessory. Details of these operations are provided below. Other controllable accessories controllable by the remote activation switch may include magnified optics, red dot or other sights, rangefinders, illumination lights, and lasers, etc.

Figure 2A:
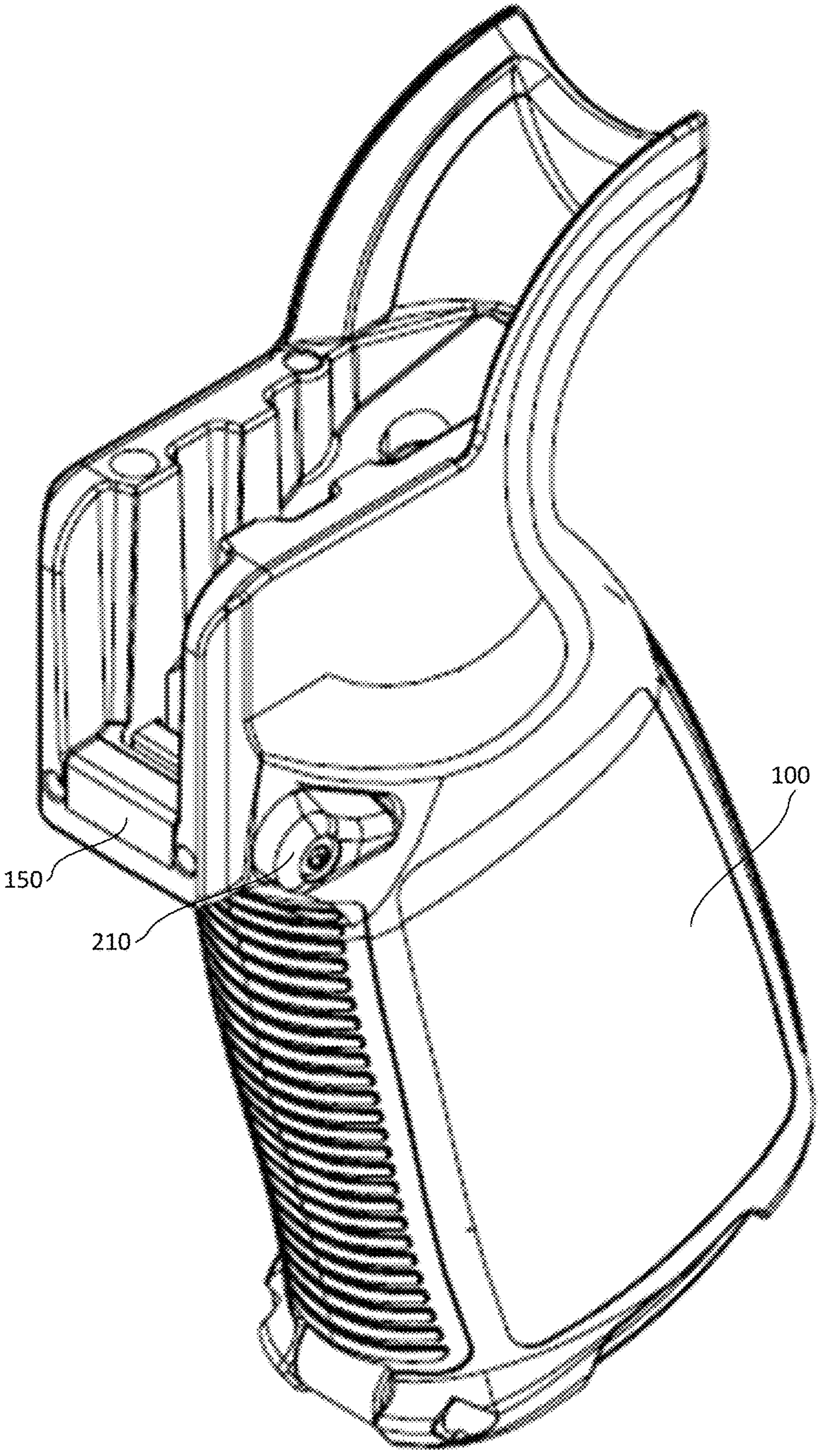
FIG. 2A is a perspective view of the grip illustrated in FIGS. 1A and 1B.

FIG. 2A is a perspective view of the grip 100 illustrated in FIGS. 1A and 1B. In some embodiments the grip 100 may be permanently mounted to a firearm. In other embodiments the grip 100 is a removable accessory and may be removed from a first firearm and securely mounted to a different firearm. The grip 100 is preferably constructed from a durable material such as plastic, plastic composites, wood or other natural materials, metal, or combinations of any of these materials. The grip 100 is shaped to comfortably fit within the hand of a shooter and is used to hold and aim the firearm 10. The grip 100 may be held in either hand of the shooter, although most shooters will have a preference for which hand is used to hold the grip. Sometimes shooters use two hands to hold the grip 100. The grip 100 includes a manually operated, remote activation switch assembly for activating and/or controlling an auxiliary device. A thumb pad 210 is the only component of the switch assembly illustrated in FIG. 2A. The remainder of the components of the switch assembly are occluded in FIG. 2A by a tunnel 150. As described below, the remote activation switch of the grip 100 may be installed in either a left-handed configuration, in which the switch is most easily operable by the thumb of the shooter's left hand, or in a right handed configuration, in which the switch is most easily operable by the thumb of the shooter's right hand. FIG. 2A shows the thumb pad 210 mounted on the left side of the grip 100 when the grip is mounted in a standard position on a firearm, which is the right-hand configuration, in which the switch is most easily operable by the thumb of the shooter's right hand.

Figure 2B:
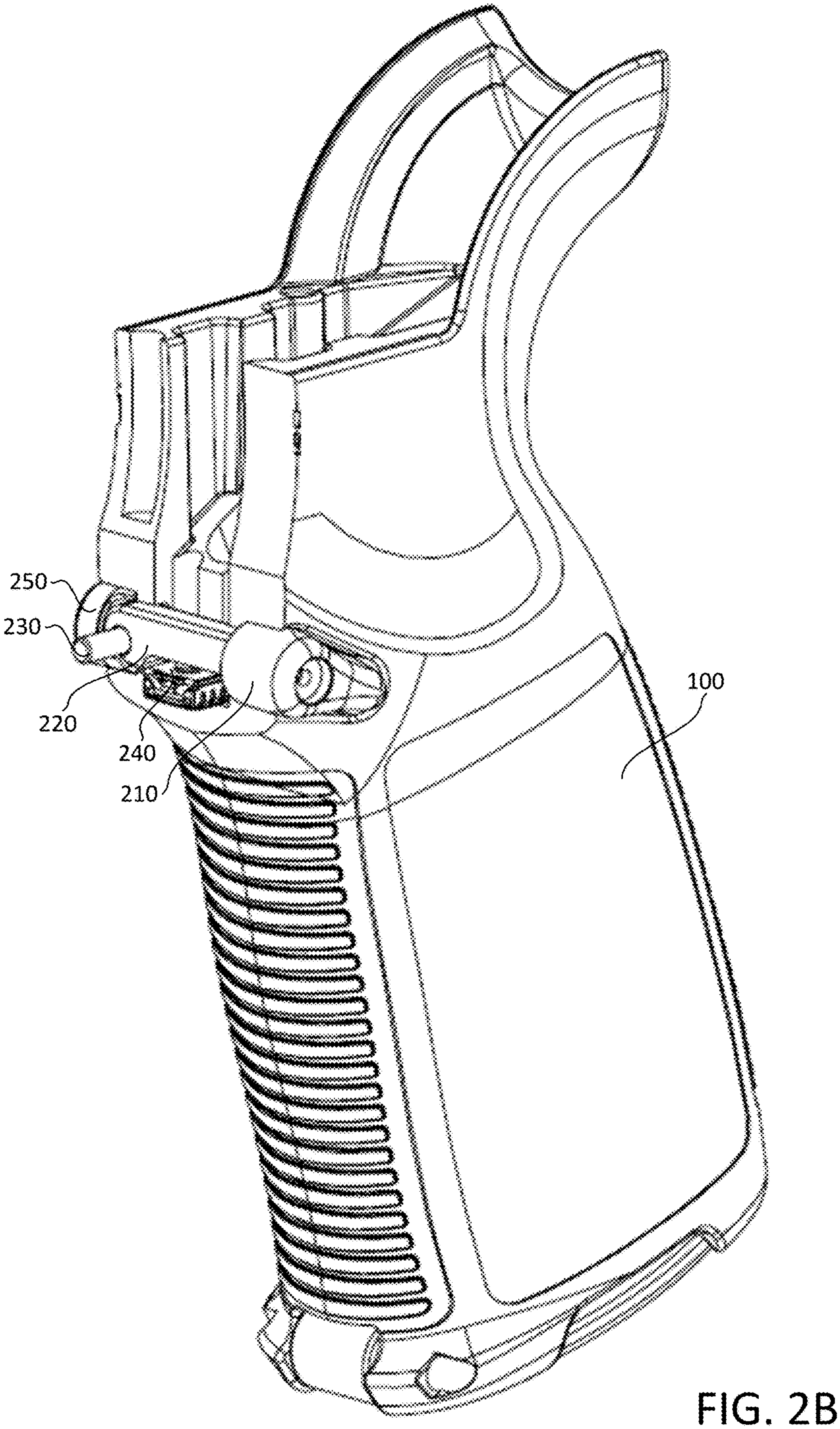
FIG. 2B is a perspective, partial cutaway view of the grip illustrated in FIG. 2A.

FIG. 2B is a perspective, partial cutaway view of the grip 100 illustrated in FIG. 2A, illustrating components of a switch assembly 200 mounted in the grip. Components of the switch assembly 200 include the thumb pad 210, lever arm 220, pivot pin 230, switch 240, and cover 250. Generally, in operation, a shooter presses in a downward direction on the thumb pad 210, which causes the lever arm 220 to pivot about an axis of the pivot pin 230. As the shooter presses the thumb pad 210 down further, the lever arm 220 first contacts and then operates the switch 240. The switch 240 is an electrical switch that, in one embodiment, provides a signal input directly to an accessory device. In another embodiment, the switch provides a signal input to a microcontroller, which in turn creates one or more signals for operating the accessory.

Figure 3:
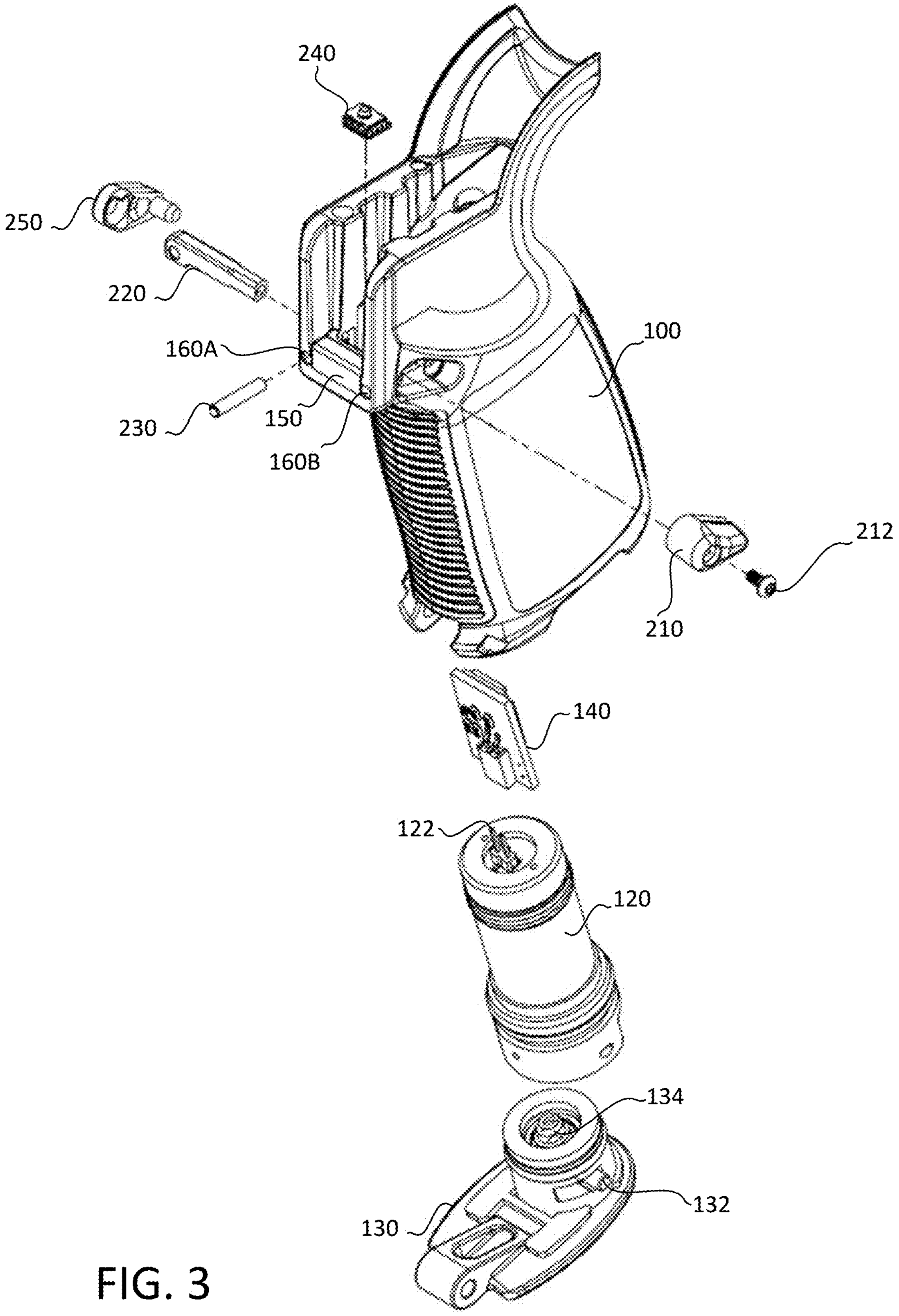
FIG. 3 is an exploded view illustrating components of a grip having a remote activation switch, according to embodiments of the invention.

Details of one embodiment of the grip are illustrated in FIG. 3, which is an exploded view of the grip 100 showing example component parts. The grip 100 is at least partially hollow and includes a void or opening to receive a battery compartment 120 internal to the grip. A battery (not illustrated) fits within the battery compartment 120 for providing electrical power to the grip 100. The battery may be rechargeable or replaceable. The battery compartment 120 is accessed by opening a swing cover 130 to expose the battery compartment. When closed, a latch 132 keeps the swing cover 130 in the closed position, sealing the battery compartment. To open the battery compartment 120, the user releases the latch 132. When the swing cover 130 is closed, a spring 134 provides a mechanical and electrical contact to one of the terminals of the battery in the battery compartment 120.

The battery compartment includes power leads 122 to carry the power from the internal battery to a control board 140. Operation of the control board 140 is described in further detail below.

Figure 4A:
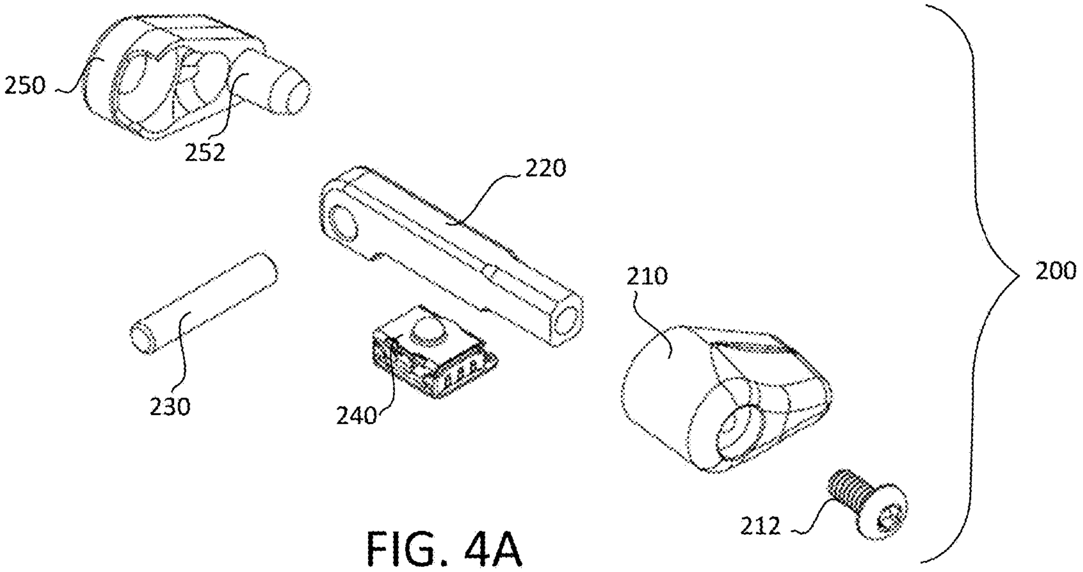
FIG. 4A is an exploded view illustrating an example set of components that make up the switch assembly 200, according to embodiments.
Figure 4B:
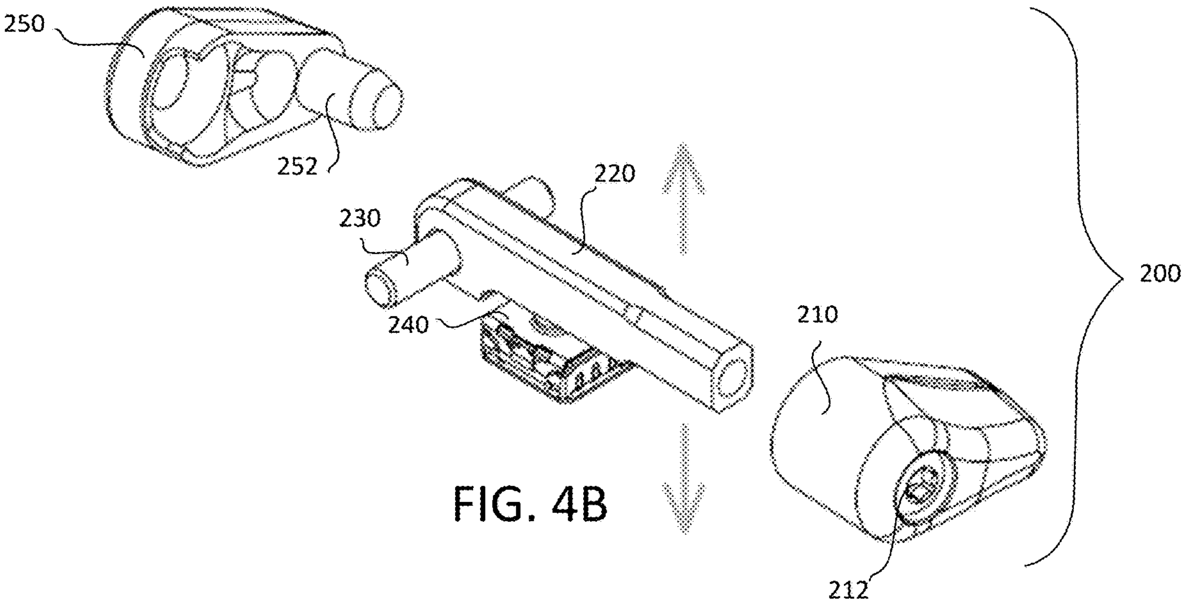
FIG. 4B is a partially exploded view of the same components as in FIG. 4A, except

The individual components of the switch assembly 200 are best illustrated in FIGS. 3, 4A, and 4B. The thumb pad 210 is secured to the lever arm 220 by a retaining screw 212. Of course any type of retainer could be used, or the thumb pad 212 could be integrated into the lever arm 220. Having the thumb pad 210 be removable from the lever arm 220 allows the lever arm to be positioned for either left-hand or right-hand operation, as described below. A pivot pin 230 is placed through an aperture 222 in the lever arm 220 and further into a pin receiver 160A in the grip 100 to anchor the lever arm to the grip. The aperture 222 is located at a pivot or distal end of the lever arm 153 and extends through the lever arm in a direction transverse to a main long axis of the lever arm. The pin receiver 160A is sized and oriented to receive the pivot pin 230 after it has passed through the aperture 222. When the lever arm 220 is anchored into the grip 100 by the pivot pin 230, the lever arm 220 is limited to an up-down motion as the lever arm pivots around the long axis of the pivot pin 230. The lever arm 220 rotates about the long axis of the pivot pin 230 so that the movement of the lever arm 220 is along a plane that is transverse to the shooting axis of the firearm. Although the lever arm 220 actually travels in an arc, and not strictly up and down, the typical user will not be able to differentiate between the two movements, as the pivot pin 230 is mounted at a distal or pivot end of the lever arm, and away from the end to which the thumb pad 210 is mounted. Also, the movement of the lever arm 220 is limited by a tunnel structure 150 (illustrated in FIG. 3) that covers the lever arm 220 and other components of the switch assembly. A cover 250 covers the pivot end of the lever arm 220. The cover 250 may also include a hollowed portion structured to receive or cradle the pivot pin 230. A mounting pin 250 may be inserted into a receiver (not illustrated in FIG. 3) of the grip 100 to hold the cover 250 in place. In the illustrated embodiments, the cover 250 has an appearance that is similar to the thumb pad 210. When fully assembled and in operation, due to the mechanical configuration described above, thumb pad 210 has limited vertical motion when pressed by a shooter, and does not move in any other direction. When mounted in place in the grip 100, the cover 250 is static and does not move.

FIG. 4A is an exploded view illustrating an example set of components that make up the switch assembly 200. FIG. 4B is a partially exploded view of the same, except this figure shows how the pivot pin 230 is mounted within and interfaces with the lever arm 220.

The switch 240 that is controlled by action of the lever arm 220 is preferably a Push-Button-Normally-Open (PBNO) switch, which completes a circuit when the switch is depressed, and breaks the circuit when the switch is released. The switch 240 includes an internal spring (not illustrated) that returns the switch to its normal, or resting position when pressure is no longer applied. The internal spring in the switch 240 is strong enough to return the lever arm 220 to its resting position when pressure is no longer applied to the thumb pad 210. PBNO switches are sometimes referred to as momentary switches. It is possible to use a Push-Button-Normally-Closed (PBNC) switch, which has the opposite function of a PBNO switch, in that the PBNC switch normally completes the circuit, and pressing the PBNC switch breaks the circuit. Either PBNO or PBNC switches may be used as the switch 240 depending on the configuration of embodiments of the invention. It is further possible that the switch 240 is an on-off switch, with a single press causing the switch to close (or open) the circuit, and a subsequent press of the switch causing the switch to open (or close) the circuit.

When assembled in the grip 100, the switch assembly 200 provides a shooter an ergonomic, sturdy, and durable switch apparatus for operating an accessory mounted to the shooting device. When the switch assembly 200 controls a wireless signal, the accessory may be anywhere within the range of the wireless signal, and does not necessarily need to be mounted to the shooting device.

The switch assembly 200 may be installed into the grip 100 in either right-hand or left-hand configurations. In the right hand configuration, lever arm 220 is first inserted through the tunnel 150 (FIG. 3) so that the aperture 222 is on the right side of the grip 100, when viewed from the rear of the grip. Next, the pivot pin 230 is installed through aperture 222 of the lever arm 220 and into the pin receiver 160A of the grip 100. The pin receiver 160A is best seen in FIG. 3, which is on the right hand side of the grip 100 as viewed from behind the grip and along the shooting, or long, axis of the firearm. After the pivot pin 230 is installed into the pin receiver 160A, the thumb pad 210 may be attached to the lever arm 220 with the thumb pad retainer 212. Lastly, the cover 250 is press-fit into the grip 100. The cover 250 cradles the pivot pin 230 and is sized and shaped to allow the lever arm 220 to pivot about the long axis of the pivot pin. In this position, the shooter can operate the switch 240 by pressing downward, i.e., toward the swing cover 130 on the grip 100. This downward motion applied to the thumb pad causes the lever arm 220 to pivot about the pivot pin 130 and actuate the switch 240.

To change the switch assembly 200 from a right-hand configuration to a left hand configuration, first the cover 250 is removed. Next the thumb pad retainer 212 is removed from the lever arm 220, which releases the thumb pad 210. Then the pivot pin 230 is removed from the pin receiver 160A, and also from the aperture 222 of the lever arm 220. Then the lever arm 220 is removed from the tunnel 150, turned around, and re-inserted into the tunnel. Then the assembly is the same as described above for a right-hand assembly, except the pivot pin 230 will be inserted into the aperture 222 of the lever arm 220 and then further into the pin receiver 160B. The pin receiver 160B is located on the left-hand side of the grip 100 as viewed from behind the grip and along the shooting axis of the firearm. When reassembled in this left-hand configuration, the thumb pad 210 is disposed on the right hand side of the grip 100 when viewed from behind the grip, and most easily operated by the thumb of the shooter's left hand. The lever arm rotates around the long axis of the pivot pin 230, which, in turn, is mounted into the pin receiver 160B of the grip 100.

Figure 5A:
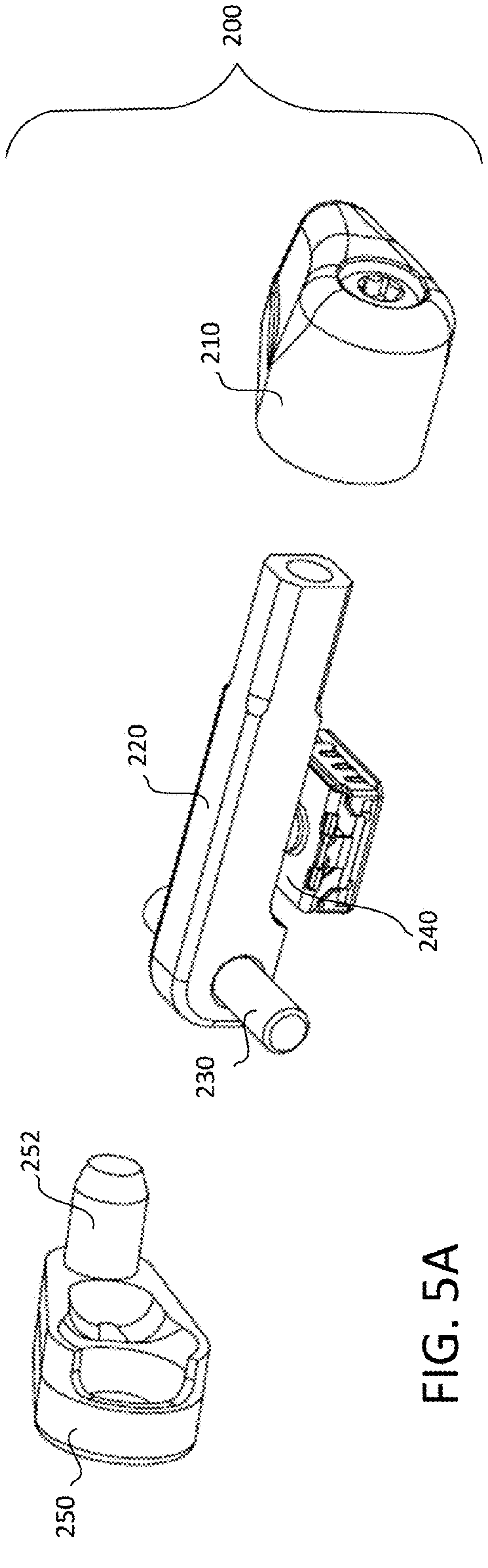
FIG. 5A is an exploded view that illustrates the orientation of a switch assembly configured for a right-handed shooter, according to embodiments.
Figure 5B:
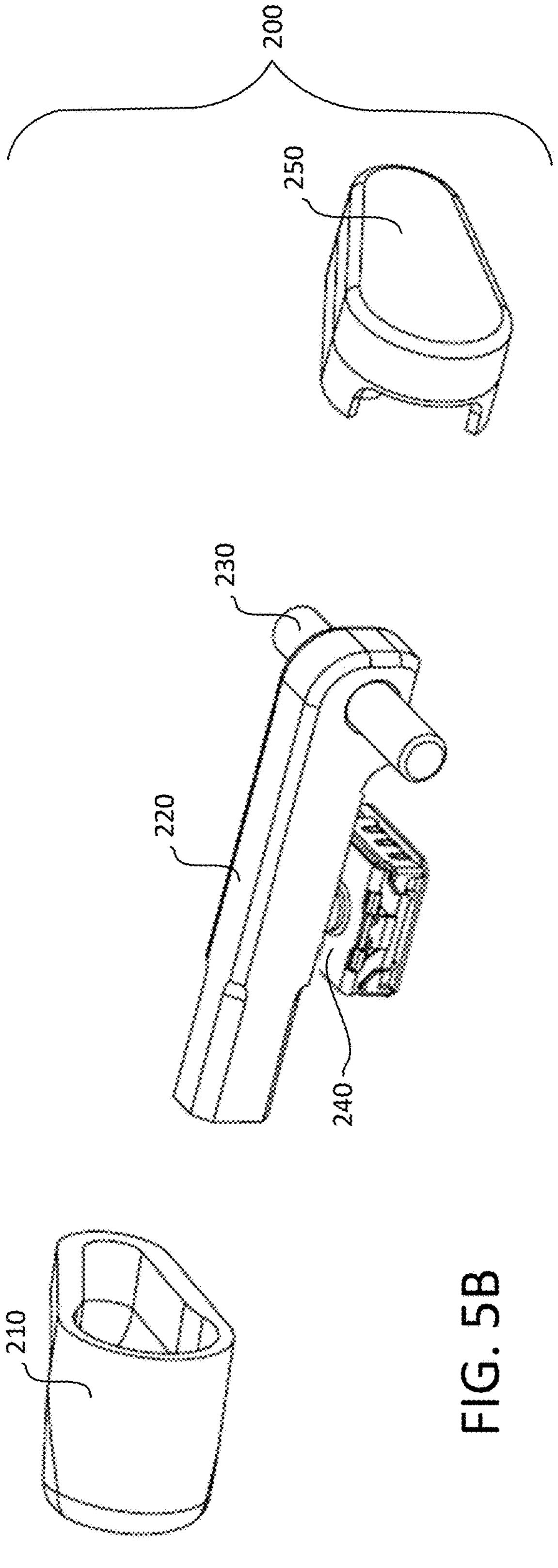
FIG. 5B is an exploded view that illustrates the orientation of the switch assembly 200 configured for a left-handed shooter, according to embodiments.

FIG. 5A is an exploded view that illustrates the orientation of the switch assembly 200 configured for a right-handed shooter. FIG. 5B is an exploded view that illustrates the orientation of the switch assembly 200 configured for a left-handed shooter.

Figure 6:
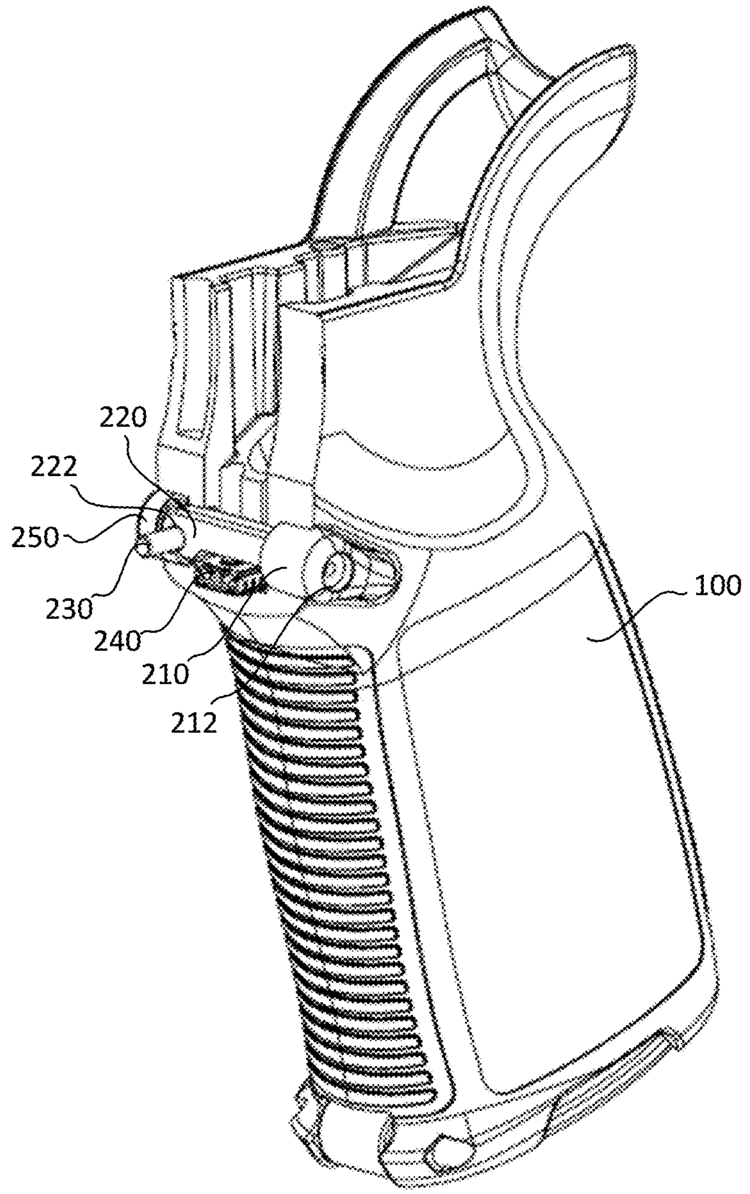
FIG. 6 is a perspective, partial cutaway view of the grip illustrated in FIG. 2A illustrating the switch assembly mounted in the grip, according to embodiments.

FIG. 6 is a perspective, partial cutaway view of the grip illustrated in FIG. 2A illustrating the switch assembly mounted in the grip, according to embodiments. In this illustration, the thumb pad retainer 212 mounts the thumb pad 210 to the lever arm 220. The pivot 230 is placed through the aperture 222 of the lever arm 220, and further into the pin receiver 160A (shown in FIG. 3). The other pin receiver 160B (shown in FIG. 3) is blocked by the placement of the lever arm 220. The pivot 230 secures the lever arm 220 to the grip 100. The cover 250 covers the pin and distal end of the lever arm 220 for a completed look.

Figure 7B:
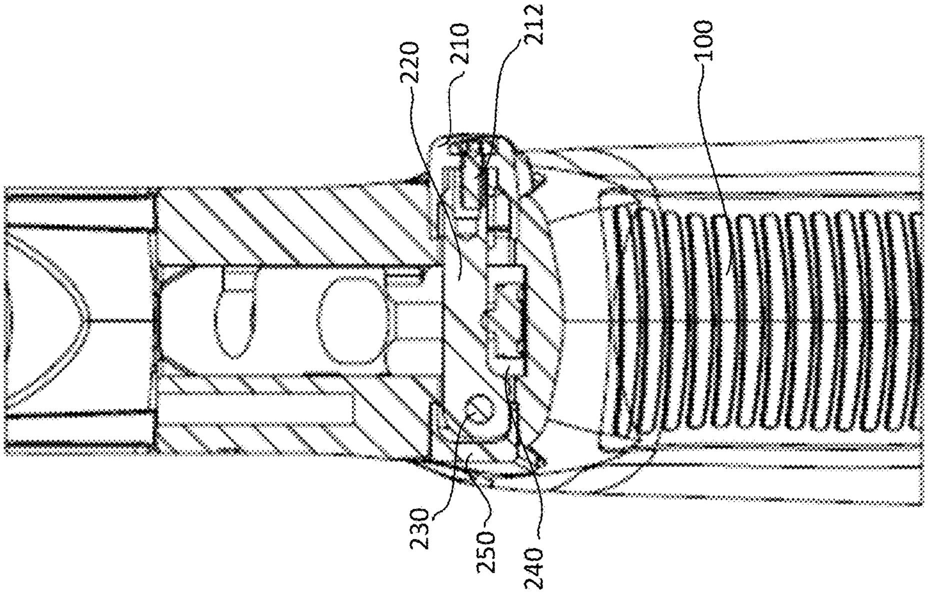
FIG. 7B is a front, partial cutaway view of the grip taken along the cut line shown in FIG. 7A, according to embodiments.
Figure 7A:
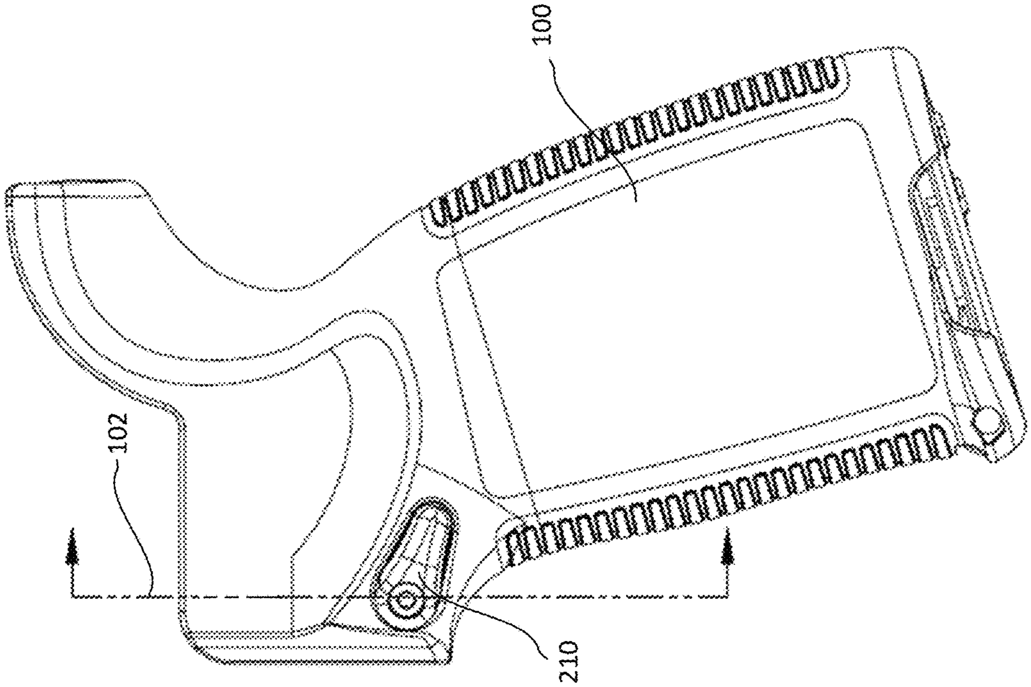
FIG. 7A is a side view of a grip including a switch assembly, according to embodiments.

FIG. 7A is a side view of the grip 100 illustrating a position of a cut line 102, according to embodiments. FIG. 7B is a front, partial cutaway view of the grip taken along the cut line shown illustrated in FIG. 7A, according to embodiments. With reference to FIG. 7B, the front end of the grip 100 is illustrated, along with components of the switch assembly 200.

As introduced above, the switch 240 may be wired directly to an accessory, such as the accessory 20 of FIG. 1A, or the switch 240 may be connected to a control board 140, also referred to as a microcontroller 140 or microprocessor module 140 as illustrated in FIG. 3. In its most simple implementation, the switch 240 may be a wired connection that is directly coupled to the accessory, and the operation of the switch controls the operation of the accessory. The accessory itself may include a microprocessor so that the accessory may have more switch functions than merely on and off, but those operations are outside the scope of this disclosure.

In other embodiments, the switch 240 is coupled to the microprocessor module 140, as illustrated in FIG. 3. In this embodiment, the switch 240 is an input to the microprocessor module 140, and the microprocessor module generates a signal that is used to control an accessory. The output of the microprocessor module 140 may be wired or wireless. In the wired embodiment, the microprocessor module is physically connected by an electrically conductive material, such as a copper wire, to an accessory on the firearm. The input to the microprocessor module 140 is a signal generated by the switch 240. In a simple embodiment, the microprocessor module 140 may be a wireless module that generates a particular wireless signal in direct response to when the switch 240 generates a signal. In such an embodiment, a shooter pressing down on the thumb pad 210 causes the switch 240 to generate an input for the microprocessor module 140, which is then sent over a wireless communication channel that was established with an accessory, such as Bluetooth, Zigbee, Z-wave, or IoT communication channels such as Thread. The signal generated by the microprocessor module 140 is wirelessly sent to the accessory, which receives and interprets the signal. In yet other embodiments, the microprocessor module 140 may accept input from the switch 240, such as in certain patterns, and the microprocessor module 140 generates control signals itself based on the matched input patterns. For instance, the microprocessor module 140 may generate a signal to cause a flashlight accessory to set itself at its highest brightness when the user presses the thumb pad 210 down for two long presses separated by a short release. Other codes may include turning on or off an accessory by pressing the thumb pad 210 down twice in quick succession. The microprocessor 140 may be programmed to recognize any pattern of long or short presses of the switch 240, each press caused by the shooter pressing the thumb pad 210 down, and generate appropriate signals to control an accessory. In some particular embodiments the microprocessor 140 may be a BMD-340 from Rigado, Inc. of Salem, Oreg., or a MDBT50Q-1MV2 from Raytac Corporation of Taiwan.

The previously described embodiments of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method or process having two or more defined steps or operations, the defined steps or operations can be carried out in any order or simultaneously, unless the context excludes those possibilities.

Furthermore, the term "comprises," "includes," and their grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components. Similarly, an article "including" or "which includes" components A, B, and C can contain only components A, B, and C, or it can contain components A, B, and C along with one or more other components.

Also, directional words such as "right," "left," "up," "down," "forward," or "backward" are used for convenience and in reference to the views provided in figures.

Although specific aspects of the disclosure have been illustrated and described for purposes of illustration, it will be understood that various modifications may be made without departing from the spirit and scope of the disclosure.

Accordingly, the invention should not be limited by the particular embodiments presented herein.

I claim:

1. A grip for a firearm having a controllable accessory, the grip having a first axis aligned with a long axis of the firearm and having a second axis transverse the first axis, the grip comprising:

an elongated switch lever having a pivot end and a controlled end, the elongated switch lever having a long axis aligned with the second axis of the grip and coupled at the controlled end to a thumb pad extending beyond a main body of the grip;

a pivot disposed at the pivot end of the elongated switch lever about which the elongated switch lever may rotate about a third axis parallel to but distinct from the first axis; and a switch mounted in the grip adjacent to the elongated switch lever and configured to change states when the thumb pad is depressed.

2. The grip for a firearm according to claim 1, in which the elongated switch lever physically operates the switch when the elongated switch lever is depressed.

3. The grip for a firearm according to claim 2, in which the elongated switch lever is depressed when the user depresses the thumb pad.

4. The grip for a firearm according to claim 1, in which the switch is a spring return switch.

5. The grip for a firearm according to claim 1, in which the switch generates a switch signal, and in which the switch signal is conveyed to a programmable controller disposed within the grip.

6. The grip for a firearm according to claim 5, in which the controller generates a control signal for a firearm accessory.

7. The grip for a firearm according to claim 5, in which the control signal is conveyed to the firearm accessory through a physical wire.

8. The grip for a firearm according to claim 5, in which the control signal is conveyed to the firearm accessory wirelessly.

9. The grip for a firearm according to claim 5, in which the controller is a microprocessor.

* * * * *